Figure 1:
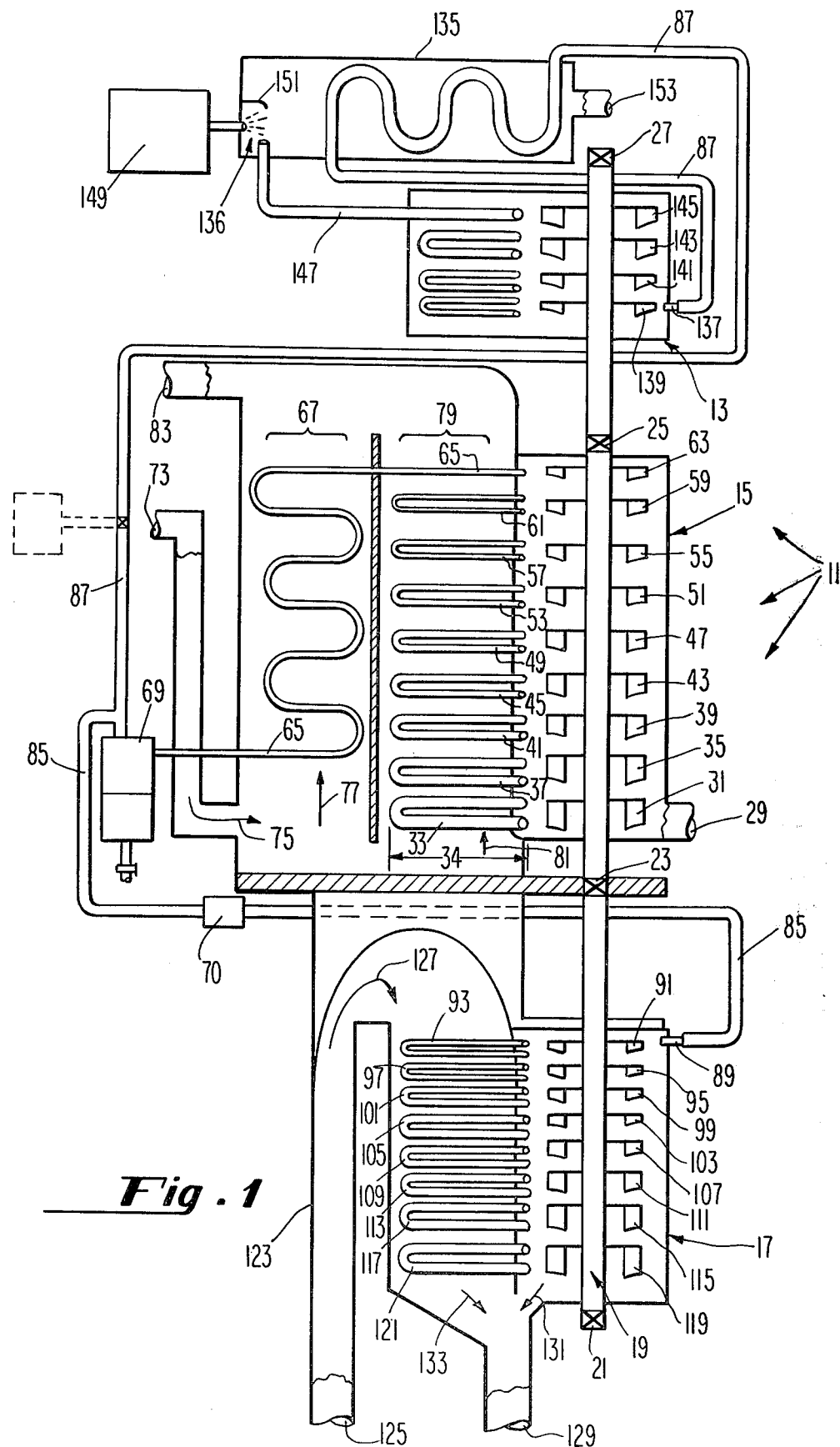

{ # United States Patent [19]

Trumpler

[11] 4,196,773
[45] Apr. 8, 1980

[54] HEATING AND AIR COOLING SYSTEM EMPLOYING A GAS TURBINE

[75] Inventor: Paul R. Trumpler, Strafford, Pa.

[73] Assignee: Turbotherm Corporation, Wayne, Pa.

[21] Appl. No.: 882,259

[22] Filed: Feb. 28, 1978

[51] Int. Cl.² ............................................. F25B 13/00
[52] U.S. Cl. ........................................ 165/62; 62/239;
  62/402; 60/39.07; 415/179; 60/39.67
[58] Field of Search ..................... 165/15, 62; 62/239,
  62/402; 60/39.07, 39.67; 415/179

[56] References Cited

U.S. PATENT DOCUMENTS

| | | | |
|---|---|---|---|
| 2,409,159 | 10/1946 | Singleton | 60/39.67 |
| 2,585,570 | 2/1952 | Messinger et al. | 62/402 |
| 2,618,470 | 11/1952 | Brown et al. | 165/62 |
| 2,669,100 | 2/1954 | Peterson | 60/39.07 |
| 3,494,145 | 2/1970 | Davis et al. | 62/402 |

*Primary Examiner*—Albert W. Davis, Jr.
*Assistant Examiner*—Margaret A. Focarino
*Attorney, Agent, or Firm*—William E. Cleaver

[57] ABSTRACT

The present system employs a turbine engine system which has three turbo rotor sections coupled to the same drive shaft. The first section employs a high temperature multi-stage expansion turbine to provide the major source of mechanical power. The second section employs a multi-stage turbo compressor which functions to compress air from the ambient, and such compression provides heat, through an interstage heat exchanger, to a heat reservoir, which may be an enclosure which it is desired to heat, or the atmosphere. The third section takes part of the compressed air from said second section and, (after said air is cooled either to near ambient temperature in the cooling mode or near the enclosure temperature in the heating mode) expands that air in a low temperature multi-stage expansion turbine to accomplish three goals. First, the expansion of the compressed air drives the expansion turbine to provide a second source of mechanical power which assists in driving the compressor section. Secondly, the expansion-cooled air, passing through the conduits of an interstage heat exchanger of the third section, extracts heat from air passing across said conduits, said heat being an added input of heat into the system. The cooling of this last-mentioned air provides for extraction of heat from the source of that air; i.e., either from an enclosure which it is desired to cool, or from the atmosphere. Thirdly, the expanded air as it is discharged from the expansion turbine is itself a cooling source and may be mixed with the air passing across the conduits of the third section which together provide a source of cool air.

10 Claims, 2 Drawing Figures

HEATING AND AIR COOLING SYSTEM EMPLOYING A GAS TURBINE

BACKGROUND

Heating and air cooling systems which employ gas turbines are known and have been used principally with air temperature control systems for jet aircraft. In such systems, air is normally taken from the ambient and pumped into a bifurcated conduit or line. One section of the bifurcated line feeds the combustion chamber of the gas turbine whereat it is mixed with fuel and ignited to provide the reaction phenomenon or jet action to drive the aircraft. The other path of the bifurcated line takes the ambient air (which has been raised to some higher pressure than its ambient pressure) after it has been pumped aboard, and directs it through a heat exchanger to the cabin of the aircraft to warm the cabin. In some versions of the system, see, for instance, U.S. Pat. No. 2,618,470, this air is used to drive a one-stage pump and the pump is usually coupled to an electrical generator or some other load that needs mechanical power. The pump, of course, is driven and the air is cooled somewhat during this operation. However, it should be understood that the principal source of cooling the air for the aircraft system is the outside atmosphere with its low temperature. When an aircraft is flying at 20,000 feet or more, the ambient air temperature is very cold, so providing a source of cool air is not a major problem.

In these aircraft systems the main purpose of the equipment is to extract heat from the turbine exhaust and use that heat to warm the cabin, prevent icing, and do some additional work through such devices as the single stage pump mentioned above. It should be borne in mind that finding a source of heat is a relatively simple matter and is a by-product of a system which is already present in a jet aircraft because the exhaust temperatures of the jet engines are about 1,000° F. Further, as part of the background, it should be understood that in an airplane system, cost is not a controlling factor and since both the source of heat and the source of cold temperatures are readily available, providing such sources does not add to the cost of the air temperature control system.

Summary

The present system is a form of a gas turbine driven heat pump. Ambient air is brought into a turbo compressor, which is the second section of a three-section turbine engine system. In the turbo compressor, the ambient air is compressed through a plurality of stages, thereby generating heat. The compressed air is passed through the conduits of a heat exchanger and air which is to be heated is passed over said conduits to effect the heating thereof. The conduits are elongated sections of the turnaround channels of the turbo compressor.

The present system uses the third section of a three-section turbine engine system to effect a favorable heat exchange balance of the system which in effect causes heat to be "pumped" from a low temperature reservoir to add (in accordance with the conservation of energy; i.e., energy balance) to the heat generated by burning the fuel. The immediate foregoing is accomplished by expanding (in a third section) the compressed air from the second section (after water has been extracted therefrom) through a plurality of expansion stages in a multistage expansion turbine. The expansion turbine of the third section also has elongated pipes, or conduits, for the turn-around channels. Accordingly, air from which heat is going to be extracted, to effect the energy exchange balance, is passed over said conduits and becomes cool. The heat extracted provides further energy to expand the air being passed to drive the expansion turbine of the third section and also acts to reduce any likelihood of icing.

If the air flowing across the heat exchange conduits of the third section is cool, as for example in winter during the heating season, the compressed air in the expansion turbine may be dropped in temperature sufficiently to cause ice formation unless water is first removed from the compressed air entering the expansion turbine. Most of said water is extracted by cooling the compressed air after it leaves the second section, but the remaining traces are removed in a drying device or dessicator. If, on the other hand, the air flowing across the heat exchange conduits of the third section is warm, as for example in summer during the cooling season, the compressed air in the expansion turbine will be sufficiently heated in the interstage conduits that, if sufficient stages are provided, in the third section, to limit the temperature drop per stage of the expanding air, no ice will be formed in the expanding air passages. The expansion turbine of the third section provides torque to the system to help drive the turbo compressor.

The present system further employs an expansion turbine in the first section. The expansion turbine in the first section is the main source of mechanical power used to drive the turbo compressor. That portion of the compressed air from the second section which is not directed to the third section, is directed to the expansion turbine of the first section. Such compressed air is passed through the heat exchanger associated with the combustor where it is heated to high temperature. The high temperature, high pressure air leaving the combustor heat exchanger is directed to drive the expansion turbine of the first section. It is, of course, possible to drive the first source of mechanical power by some other means in which case none of the compressed air would be directed to the first source of mechanical power.

The system provides an air duct system which enables air to be driven over the conduits of the interstage heat exchanger of the second section, to extract heat from the compressed air in the interstage conduits of the second section and carry that heat to an enclosure, such as a room or to the atmosphere if the system is being used as a cooling means. The system further provides a duct system for passing air over the conduits of the interstage heat exchanger of the third section to cool such air and to direct it to an enclosure such as a room, or to the atmosphere whereby with the latter operation the system is being used in the heating mode.

Figure 2:
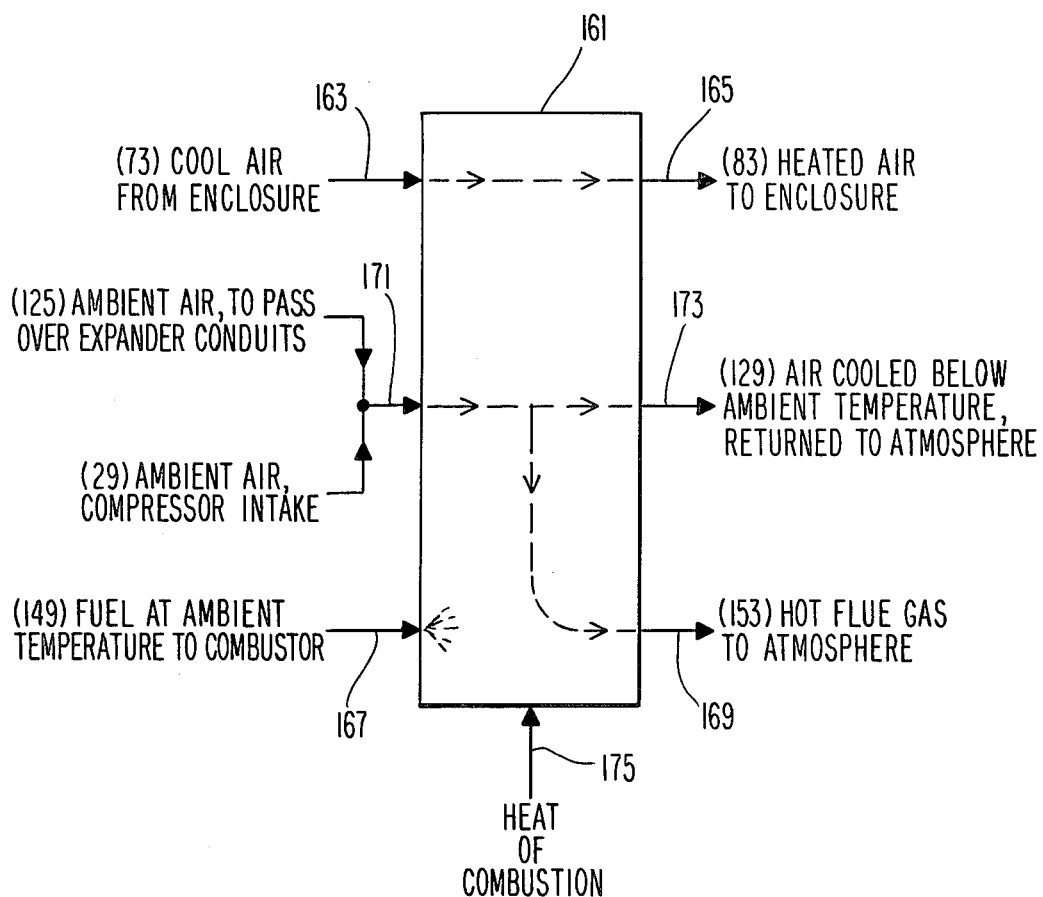

The objects and features of the present invention will be better understood in view of the following description taken in conjunction with the drawings wherein:

FIG. 1 depicts in a schematic layout, the three sections of the present invention, including three heat exchangers, two water extracting devices and a combustion means; and FIG. 2 is a graphic representation of the energy balance equation.

The present system can function either as a source of heat for an enclosure, by transfering the heat of air compression in the second section to said enclosure, or alternatively as a means of cooling an enclosure, by using the cooling effect of the low temperature expansion turbine of the third section. When the system is viewed as an enclosure heater, which for this description is seen as its primary application, the cold air stream or streams returning lower-than-ambient-temperature air to the atmosphere as they exhaust from the third section represent a vital part of the energy balance equation; namely, the extraction of heat from the atmosphere with a consequent delivery of equal heat to the entire system. In accordance with the principle of the conservation of energy, the heat extracted from the air is combined with the heat from fuel (as a source of energy to drive the machinery) entering the combustion chamber to make possible a heat delivery to the enclosure greater than the heat supplied only by the fuel fired. Heretofore, practical enclosure heating systems such as oil, gas or coal fired hot air furnaces, while much simpler in design because they make no major use of machinery, have been incapable of delivering to the enclosure more heat than can be derived directly from the fuel fired, thus resulting in under-utilization of the fuel. This concept will be better understood from the discussion related to FIG. 2.

When the high pressure air delivered by the turbo compressor of the second section is cooled to near ambient temperature, most of the water vapor originally in said air becomes liquid and is withdrawn from the air stream as condensate. In many geographical areas of the world, where water is difficult or expensive to obtain, the comparatively pure water which is condensed out of the air may be a valuable by-product of system operation. Even in the smallest system which may be practically contemplated today, the rate of condensate withdrawal is measured in gallons per hour, which may suffice for personal use but hardly for normal agriculture or industry use.

Consider FIG. 1 which shows a turbine engine system 11 which is made up of three sections 13, 15 and 17. As can be seen in FIG. 1, the turbo unit of each of the three sections 13, 15 and 17 is coupled to a common shaft 19. The shaft 19 is arranged to turn in four bearings 21, 23, 25 and 27. It should be understood that the drawing has the side portions of the system cut away so that the shaft is shown in an unsectionalized view and the turbine blades only have portions thereof shown so that an understanding of the system can be ascertained. The system in the preferred embodiment would have the shaft 19 standing in a vertical position, but it could be arranged to lie along a horizontal plane.

Consider the second section of the turbine engine system section 15, which is the compressor section of the system. For the moment, consider that the system is being driven; i.e., shaft 19 rotating and an understanding of how this is accomplished will become apparent hereinafter.

When the system is in operation, ambient air is brought in through the pipe 29. This ambient air goes through a plurality of compressor stages. It will be noted in the drawing that each of the blades gets progressively smaller as do the cross-sections of the looped conduits or elongated turnaround tubes, through which the air is taken during the compression effort. In short, the air enters the pipe 29 and is subjected to a compression process by the first stage 31 which operates in conjunction with the conduit 33. Now it should be understood that the elongated turnaround tubes 33, 37, 41, 45, 49, 53, 57, 61 and 65 are shown reduced as compared to the turbine blades. In the preferred embodiment the conduits 33–65 are about twelve inches from the entry opening to the turnaround location. Accordingly, there is a 12-inch length along dimension 34 which provides a good heat exchange surface. The blades on the turbo compressor in the preferred embodiment extend to a diameter of about 5 inches for a minimum-duty system. These dimensions can vary depending on cost factors and load, but the system needs to provide a substantially long turn around path for the air that is being compressed in order to get a good heat exchange.

This air which is compressed is passed through the conduit 33 and returned to the turbo compressor blade chamber; i.e., to the inlet of the following compressor stage. Thereafter it is subjected to further compression by the second stage blades 35 which operate in conjunction with the conduit 37 to compress the air a second time. This operation is repeated through the compressor stages 39, 43, 47, 51, 55 and 59. Finally the air is compressed by the impeller 63, and it is passed into the conduit 65. The compressed air is led through conduit 65 into an after cooler 67. It should be understood that the compressed air, in each of the conduits 33, 37, 41, 45, 49, 53, 57, 61 and 65, has given up heat in accordance with its compressed state and hence the surface of each of these conduits is relatively warm, or hot. These conduits in the preferred embodiment have fins thereon which enhance the heat exchange. It should also be noted that the compressed air in conduit 65 is at relatively high pressure. This compressed air in the conduit 65 is directed downward through the after cooler 67 into the water removal stage 69. The hot high pressured air in the turn around tubes 33–65 and passing through the after cooler 67 provides the heat exchange to the air passing over the elongated turn around tubes. In this system, air is the medium which gives up the heat to warm a second charge of air.

While the preferred embodiment shows a long turn around tube for each stage, it may not be necessary to have a long turn around tube at each stage (e.g., there could be an elongated turn around tube at every other stage), if the cost and load factors are such that a different heat exchange mode is sufficient. However, in order to effect the heat exchange which is novel to this system, a plurality of elongated turn around tubes is necessary.

In the preferred embodiment, the air passing through the pipe 65 is at 242° F. and at 440 p.s.i. pressure, and this is based on normal atmospheric air entering pipe 29 at 20° F. Air leaves the pipe 65 when entering the water removal device at 90° F. and 436 p.s.i. The elongated turn around conduits 33, 37, 41, 45; 49, 53, 57, 61 and 65, in conjunction with the chambers 79 and 67, act as a heat exchanger. Air which is going to be conducted into a room, for the purpose of warming that room, is initially brought into the pipe 73 and is conducted downward and into the chambers 79 and 67 as shown by the arrow 75. Part of that air passes upward through the after cooler 67 as shown by the arrow 77 and part of that air is passed up through the chamber 79 as shown by the arrow 81. The air passing through both the chamber 67 and the chamber 79 is ultimately led from the heat exchanger out through the pipe 83 into the room (or enclosure) which is to be warmed. In the preferred embodiment the air temperatures leaving the pipe 83 can be made to be as high as 117° F. while passing therefrom and 14.7 p.s.i.

As explained above, the air passing over the turn around pipes 33 through 61, as well as over the after cooler tubes 67, is heated, which is an important purpose of the system operating in the heating mode. It should be borne in mind that the giving up of the heat could be useful in refrigeration as a means of transferring heat from a low temperature source (the ambient air at 20° F.) to a high temperature sink (the air in chambers 79 and 67). Further, it should be understood that the giving up of heat of compression to the air which is flowing to the enclosure has an additional benefit for the system. By passing heat to the air flowing in chambers 79 and 67, the compressed air in the turn around tubes and after cooler is cooled and hence the work necessary to compress the air at each stage in the turbo compressor is reduced. To say it another way, the energy given up in the heat exchange reduces the amount of energy necessary for compression. Since the power requisite for compression is reduced, the efficiency of the system is greatly improved, which, of course, is a highly desirable aspect of the present system.

When the compressed air which is in pipe 65 is led into the first water removal device 69, the water therein is extracted. Now the water removal device 69 can be a centrifugal separator wherein the air is directed around the separator, drawing off the water to the side and having the water settle in the bottom of the separator device. In the preferred embodiment the system may produce two to three gallons of water per hour. The water separator device can be of the Cyclone type manufactured by R. P. Adams Company of Buffalo, N.Y. It is important that the water be extracted from the air in the system because, as will become apparent hereinafter, it reduces the likelihood of icing when the air goes through the expansions experience and it also mitigates the likelihood of a phenomenon called "slugging"; i.e., when droplets of water get into the heating part of the system. In certain applications the water thus extracted from the atmosphere may be a very useful by-product of system operation.

The air which in the preferred embodiment is at approximately 436 p.s.i. and approximately 90° F. leaves the water separator 69 and enters a compressed air directing means or a bifurcated conduit, one section of which is 85 and the other section of which is 87.

If we consider again that the system is operating, with the understanding that we will deal with the main source of torque hereinafter, we can follow the excursion of the relatively warm and relatively high pressured air along the conduit 85 into the turbo expander section 17 of the system. It has been found that prior to the air, in conduit 85, being passed to the turbo expander section 17, it is desirable to pass said air through a second water removal device 70. The device 70 can be a silica-gel means or some other suitable means to further remove water. It will be noted in the expansion section 17 that each of the stages has its blades getting progressively larger, indicating that there is an expansion process in this section of the turbine. Accordingly when the high pressured relatively warm air enters through the nozzle 89 it is expanded at the first stage 91 which operates in conjunction with the turn around conduit 93. This once-expanded air is returned to the turbine chamber where it is expanded once again by the impeller 95 operating in conjunction with the turn around conduit 97. The expansion operation continues with each of the stages 103, 107, 111, 115, and 119, effecting a further expansion of the air.

The expansion process drives the turbo expander 17 and provides additional torque to drive the turbo compressor 15. However, the air passing through the conduits 93 through 121 is stage by stage becoming very cold. In keeping with the classical energy balance equation, ambient air is brought through opening 125 into duct 123, follows the path of arrow 127 and passes across the conduits 93 through 121. The passing of the ambient air over the conduits 93 through 121 has a three-fold effect. This action helps satisfy the energy balance equation by adding heat to the air in the conduits 93 through 121. The addition of the heat provides further energy to help drive the turbo expander 17 along with the energy realized from the expansion of the air in conduit 85. Secondly by adding heat to the expanding air, the likelihood of icing is reduced. Even though water has been extracted at two stations, icing is always a concern. Thirdly by giving up heat to the expanding air in conduits 93 through 121, the air passing thereacross and leaving, as shown at 133, is relatively cool. The last mentioned cool air joins with the cool expanded air from the turbo-expander 17 at area 131 to provide cool air at pipe exit 129. This combined cool air provides a basis for using the system as an air conditioning or air cooling device, but it provides in the heating mode a vital means of "pumping" heat from the atmosphere into the system and thence into the enclosure-heating stream.

Let us now follow the air leaving the water separator 69 and passing up along the conduit 87. The air in the conduit 87 is also at 90° F. and 436 p.s.i. as was the air in the conduit 85. The air in conduit 87 is led to heat exchanger 135 whereat it is heated to a temperature of 1700° F. but where its pressure is reduced slightly by frictional flow in the tubes. This high temperature air is passed along the conduit 87 out of the heat exchanger 135 and is transmitted through the jet or nozzle 137 into the power section 13 of the turbine system 11. It will be noted that the section 13 is also a turbo expander arrangement and as is explained in connection with turbo expander 17, the high temperature, high pressure air is passed into turbo expander 13 whereat it does work by driving the blades 139, 141, 143, and 145. There is a considerable amount of energy absorbed by the work done in section 13 and hence the air which leaves the turbine through the pipe or conduit 147 is reduced in temperature and pressure and is at 577° F. and approximately 18 p.s.i. Bear in mind that this air is not depleted of its oxygen and therefore it can be used as the oxygen charge to the combustor 136. Schematically, the fuel is shown being atomized from the fuel source 149 which acts in conjunction with the heater 151 and the oxygen source from the pipe 147 to burn the fuel in the combustion chamber 136.

The flue gas leaving the combustion chamber, heat exchanger, out of the pipe 153, is at approximately 300° F. and 14.7 p.s.i. Obviously the system could be made more efficient if flue gas were to be used for inter-heating between turbine stages 139, 141, 143, 145. In the preferred embodiment the flue gas is not used to this end because it would add more cost to the system than could probably be justified economically. It will be noted that the gases produced by combustion do not impinge upon the blades of the high temperature turbine 13, which is an attractive feature of the system because combustion products are corrosive and the materials of high-temperature blading very expensive.

The amount of air which flows along the pipe 85 as compared with the amount of air which flows along the pipe 87 is determined by the demands at the orifice of the nozzle 137 when compared to the demands at the orifice of the nozzle 89. These nozzles can be changed but once they are established the separation of the air along the lines 87 and 85 will be established. In the preferred embodiment about 47% of the air compressed in the second section and flowing through conduit 65 flows through pipe 87 and the remaining 53% through pipe 85.

The turbo machines used in the present system are conventional expansion turbines and turbo compressors, insofar as wheel, blade and nozzle design are involved. The turn-around conduits should be relatively long as described earlier and, in that sense, the present turbo machines depart radically from conventional turbo machines. In the preferred embodiment the heat exchanger conduits such as 33 through 65 are fabricated from copper or aluminum alloy material but other good heat conducting metals could be used. The rotor with compressor and turbine wheels is designed to rotate at about 40,000 r.p.m. The efficiency of the system defined as heat supplied to enclosure divided by heat input from fuel, varies between 102% and 120%, or higher, depending on component efficiencies and the extent of heat exchanger surfaces. It should also be understood that the bearings 21, 23, 25, and 27 are lubricated with a state of the art lubricating system. In addition, it should also be understood that the system can be started with an electric motor in a manner similar to starting an automobile or by a tank of compressed air. The lubrication means and start up means are state of the art means and are not included in this description because they are not part of the invention.

The energy balance for the system will show the importance of the cold stream being discharged through pipe 129 in the heating mode. If we examine FIG. 2 we find a graphic representation of the energy streams entering and leaving the isolated system that contains all the machinery. Entering the isolation block 161 are the following fluid streams: stream 163 which is air from the enclosure to be heated entering at pipe 73 in FIG. 1; stream 171 which is ambient air which enters the block 161 both at compressor intake pipe 29 and at expander intake pipe 125; stream 167, the fuel (normally oil or gas) to be fired in the combustor 136, at ambient temperature. In addition, in FIG. 2 we find leaving isolation block 161 are the following fluid streams: stream 165, the air being returned to the enclosure through pipe 83 after being heated in block 161; stream 173, air cooled below ambient temperature after having interacted with the expansion turbine of the third section and returned to the atmosphere through pipe 129; stream 169, flue gas above ambient temperature being discharged into the atmosphere through pipe 153. In the graphical representation of FIG. 2, the heat generated by burning the fuel in air inside block 161 is conveniently shown as an entering energy stream line 175.

In a standard enclosure heating system (prior art system) the cooled stream 173 does not exist. In such a system, the flows and temperatures of streams 167 and 169 establish the energy to heat stream 163 to the higher temperature of stream 165. With whatever additional machinery and devices may be added to a standard system to introduce additional ambient air and extract heat from it before its return to the atmosphere, as is done with a portion of the air stream 171 returning cooled to the atmosphere in stream 173, the heat so extracted must, by the conservation of energy principle inherent in the energy balance of block 161, be added to the enclosure air stream by increasing the temperature of stream 165 above its value as compared with the prior art systems.

In a standard system; i.e., without stream 173, if the maximum possible heat energy introduced into the enclosure stream between entrance 163 and exit 165, by a device or devices to reduce the temperature of the flue gas stream 153 to minimum temperature, is defined as a heater performance of 100% efficiency, then the introduction into the standard system of machinery to produce cooled stream 173 makes it possible to increase heat flow to the enclosure stream above the maximum heat flow of the standard system and thus achieve greater than 100% efficiency. The extent to which additional machinery is justified to provide more heat to the enclosure stream is a cost-benefit decision, balancing fuel savings against cost of additional machinery.

The present system in the preferred embodiment has been described as having the compressed air divided after leaving the first water extractor and passed to both the expander turbines in sections 13 and 17. The system could work with having all of the compressed air pass to the expander turbine in section 17 while having the power source in section 13 act independently. I have found that the embodiment shown is preferable but the version just described should be considered within the claims.

I claim:

1. A system for heating and cooling air and employing an energy source means comprising in combination: first rotating mechanical power source means driven by said energy source means; a multi-stage turbo compressor coupled to said first rotating mechanical power source means to be driven thereby, said multi-stage turbo compressor having an ambient air intake means and having a plurality of compression means to compress air brought through said air intake means and having a plurality of elongated turn around tubes formed and disposed to cooperate with said compression means to fully effect compression of said air; said elongated turn around tubes further formed of good heat conducting material and shaped to provide a relatively large surface through which heat of compression is conducted; after cooler means connected to receive the compressed air from said elongated tubes and formed of good material to effect a heat exchange; chamber means formed and disposed to pass air to be heated over said elongated tubes and over said after cooler means to effect a heat exchange to said last mentioned air and whereby the compressed air in said elongated turn around tubes is partially cooled to effect a reduction in the power required to compress the air; compressed air directing means coupled to said after cooler means to direct a portion of and alternatively none of said compressed air for coversion into power in the first rotating mechanical power source means; second rotating mechanical power means coupled to help drive said turbo compressor, said second rotating mechanical power means coupled to said compressed air directing means to receive at least a portion of and alternatively all of said compressed air whereby said compressed air is decompressed to provide power and to simultaneously provide at least one cold stream of air which can be useful to effect cooling.

2. A system for heating and cooling according to claim 1 wherein said multi-stage turbo-compressor has a shaft and wherein said plurality of compression means comprises a plurality of sets of blades connected to said shaft and wherein said multi-stage turbo compressor has a stator means and said elongated turn around tubes are mounted in said stator means.

3. A system for heating and cooling air according to claim 1 wherein said first rotating mechanical power source means includes an expansion type turbine engine and a source of energy to drive said turbine engine and wherein said second rotating mechanical power means includes an expansion type turbine engine.

4. A system for heating and cooling air according to claim 3 wherein said source of energy includes a combustor means formed to burn fuel and provide hot temperature gases and includes heat exchange means connected to said compressed air directing means to receive part of the compressed air therefrom, said heat exchange means formed to be in contact with said hot temperature gases to effect a heating of said compressed air.

5. A system for heating and cooling air according to claim 4 wherein said expansion turbine of said first rotating mechanical power source means includes means to return the air, which expanded in driving said turbine, to said combustor means to provide an oxygen charge thereto.

6. A system for heating and cooling air according to claim 1 wherein there is further included first water extraction means coupled between said after cooler means and said compressed air directing means to extract water from the compressed air before it is passed to said compressed air directing means.

7. A system for heating and cooling air according to claim 6 wherein there is included a second water extraction means coupled between said compressed air directing means and said second rotating mechanical power means to further extract water from the compressed air passing to said second rotating mechanical power means.

8. A system for heating and cooling air according to claim 1 wherein said second rotating mechanical power means includes an expansion type turbine having a stator portion and including nozzles therein to direct the compressed air from said compressed air directing means to expand and drive said turbine, thus further cooling said air from said compressed air directing means and wherein there is included in said stator portion a plurality of elongated turn around tubes through which said expanding air is passed and which elongated turn around tubes are formed of good heating conducting material and shaped to effect a good heat exchange and wherein there is further included a second chamber formed and disposed to take ambient air and pass it in contact with said last-mentioned elongated turn around tubes to extract heat from said ambient air thereby cooling the same while simultaneously providing additional energy to drive said expansion turbine of said second rotating mechanical power means.

9. A system for heating and cooling air according to claim 1 wherein said first chamber is connected to an enclosure whereby the air passing through said chamber in contact with said elongated turn around tubes and said after cooler means is air from said enclosure and wherein said first chamber is formed to return air which has been heated to said enclosure.

10. A system for heating and cooling air according to claim 9 wherein there is further included a heat exchanger means coupled to receive exhaust hot gases from said combustor means and formed to pass said hot gases in contact with said heat exchange means to return said expanded air whereby said oxygen charge is heated.

* * * * *